(12) United States Patent
Berstis (10) Patent No.: US 7,500,257 B2
(45) Date of Patent: Mar. 3, 2009

(54) BROADCAST CONTENT SCREENING SYSTEM AND METHOD

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 10/821,136

(22) Filed: Apr. 8, 2004

(65) Prior Publication Data

US 2005/0229202 A1  Oct. 13, 2005

(51) Int. Cl.
*H04H 60/33* (2008.01)
*H04H 60/56* (2008.01)
*H04N 7/16* (2006.01)

(52) U.S. Cl. ............... 725/12; 725/13; 725/10
(58) Field of Classification Search .............. 725/22
See application file for complete search history.

(56) References Cited

U.S. PATENT DOCUMENTS 6,637,029 B1 * 10/2003 Eilat et al. .............. 725/46

| | | | | |
|---|---|---|---|---|
| 2003/0031456 | A1 * | 2/2003 | Vogel | 386/35 |
| 2003/0226141 | A1 * | 12/2003 | Krasnow et al. | 725/9 |
| 2005/0229201 | A1 | 10/2005 | Berstis | |
| 2006/0218579 | A1 * | 9/2006 | Logan et al. | 725/32 |
| 2008/0052739 | A1 | 2/2008 | Logan | |

* cited by examiner

*Primary Examiner*—Alam Mushfikh
(74) *Attorney, Agent, or Firm*—Stephen J. Walder, Jr.; Diana R. Gerhardt (57) ABSTRACT

Mechanisms for screening broadcast programming are provided. A viewer is configured to receive broadcast programming, to receive commands from a user, to receive commands from an interface coupled to the viewer, to present the received broadcast programming to the user based on commands from the user, and to present the received broadcast programming to the user based on commands from the interface. A processor is coupled to the interface and configured to receive a screening signal, to receive user input from the interface, to store the received user input, to generate a local action signal based on the user input and the received screening signal, and to transmit the local action signal to the interface. The interface is configured to receive the local action signal, to transmit commands to the viewer based on the local action signal, and to receive user input from the user, the user input comprising at least an action preference.

27 Claims, 5 Drawing Sheets

BROADCAST CONTENT SCREENING SYSTEM AND METHOD

CROSS-REFERENCED APPLICATIONS

This application relates to co-pending U.S. patent application Ser. No. 10/821,043 entitled BROADCAST CONTENT SCREENING SERVICE SYSTEM AND METHOD, filed concurrently herewith.

TECHNICAL FIELD

The present invention relates generally to the field of broadcast media management and, more particularly, to a system and method for screening broadcast content.

BACKGROUND

Broadcast media, such as television and radio, generally transmit programming content to the public for free over wireless means. Thus, anyone with a device capable of receiving the broadcast signal, such as a television or radio, can watch or listen to the broadcast programming content. Similarly, cable television providers and cable or satellite radio providers often transmit broadcast programming to subscribers, some of whom would not otherwise be able to receive a wireless broadcast. For example, subscribers in Dallas can receive broadcast programming via a cable television provider in Dallas, from a broadcaster provider in Chicago, a location too distant from the subscriber for an ordinary broadcast signal to reach. Typically, cable television and satellite radio subscribers pay a fee to receive programming content.

Typical broadcast content often includes programming that the broadcast recipients can prefer to exclude or include, which will be described herein as, "content of interest" (COI). Examples of content of interest include news, traffic reports, stock market updates, advertising, violent programming, and sexual or adult situations. Previous methods to screen out content of interest have included blocking the content of interest by identifying specific transmission characteristics of the content of interest, such as a subtle tone transmitted prior to advertising, an increase in volume or loudness levels immediately preceding advertising, content blocks that are multiples of thirty-second duration, and other similar characteristics. In the particular case of advertising content, however, advertisers and/or broadcasters often change the easily recognizable characteristics of advertising content in order to avoid blockage. Additionally, broadcast content can be difficult to distinguish from content of interest, such as, for example, when a radio talk show host presents substantially advertising content in the same format as broadcast content, seamlessly transitioning from commentary to advertising and back again. Moreover, efforts to screen adult or violent content often require an entire program to be blocked, rather than only the objectionable or content of interest components of the program.

Therefore, there is a need for a method and/or apparatus for selectively blocking or screening content of interest that addresses at least some of the problems associated with conventional methods and apparatuses.

SUMMARY

In one illustrative embodiment, a system for screening broadcast programming is provided. The system comprises a viewer configured to receive broadcast programming, to receive commands from a user, to receive commands from an interface coupled to the viewer, to present the received broadcast programming to the user based on commands from the user, and to present the received broadcast programming to the user based on commands from the interface. The system further comprises a processor coupled to the interface and configured to receive a real time screening signal (RTSS) and a precision screening signal (PSS), to receive user input from the interface, to store the received user input, to generate a local action signal based on the user input and at least one of the received RTSS or PSS, and to transmit the local action signal to the interface. The interface is configured to receive the local action signal, to transmit commmands to the viewer based on the local action signal, and to receive the user input from the user, the user input comprising at least an action preference.

Moreover, the system comprises a broadcast recorder coupled to the interface and configured to receive broadcast programming, to store the received broadcast programming, and to transmit the stored broadcast programming to the viewer in response to user commands. The RTSS is generated based on real time monitoring of the broadcast programming being presented in real time. The PSS is generated based on a playback of at least one portion of a recording of the broadcast programming. The processor, in response to the broadcast programming being presented to the user via the viewer in real time, generates the local action signal based on the RTSS. In response to the broadcast programming being presented to the user via the viewer as a playback of the stored broadcast programming, the processor generates the local action signal based on the PSS.

The RTSS is generated by reconciling a plurality of screening signals from a plurality of different viewers of the broadcast programming prior to the broadcast programming being presented to the user. The PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

In another illustrative embodiment, a system for screening broadcast programming is provided that comprises a viewer and an interface. The system comprises a viewer configured to receive broadcast programming, to receive commands from a user, to receive commands from an interface coupled to the viewer, to present the received broadcast programming to the user based on commands from the user, and to present the received broadcast programming to the user based on commands from the interface. The interface is configured to receive a real time screening signal (RTSS) and a precision screening signal (PSS), to receive user input from the user, the user input comprising at least an action preference, to store the received user input, and to transmit commands to the viewer based on the user input and at least one of the received RTSS or PSS. The RTSS is generated based on real time monitoring of the broadcast programming being presented in real time. The PSS is generated based on a playback of at least one portion of a recording of the broadcast programming.

In response to the broadcast programming being presented to the user via the viewer in real time, the commands are generated based on the RTSS. In response to the broadcast programming being presented to the user via the viewer as a playback of the stored broadcast programming, the commands are generated based on the PSS. The RTSS is generated by reconciling a plurality of screening signals from a plurality of different viewers of the broadcast programming prior to the broadcast programming being presented to the user. The PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

In still another illustrative embodiment, a system for screening broadcast programming is provided that comprises a processor coupled to an interface and configured to receive a real time screening signal (RTSS) and a precision screening signal (PSS), to receive user input from the interface, to store the received user input, to generate a local action signal based on the user input and at least one of the received RTSS or PSS, and to transmit the local action signal to the interface. The system further includes the interface, which is configured to receive the local action signal, to transmit the local action signal to a viewer, and to receive user input from the user, the user input comprising at least an action preference. The RTSS is generated based on real time monitoring of the broadcast programming being presented in real time, the PSS is generated based on a playback of at least one portion of a recording of the broadcast programming. The RTSS is used to control presentation of the broadcast programming to the user via the viewer in real time. The PSS is used to control presentation of the broadcast programming to the user via the viewer as a playback of stored broadcast programming. The RTSS is generated by reconciling a plurality of screening signals from a plurality of different viewers of the broadcast programming prior to the broadcast programming being presented to the user. The PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

In a further illustrative embodiment, a computer program product for screening broadcast programming is provided. The computer program product has a recordable medium with a computer program recorded thereon. The computer program, when executed by a computing device, causes the computing device to receive a real time screening signal (RTSS) and a precision screening signal (PSS) and receive user input from a user, the user input comprising at least an action preference. The computer program further causes the computing device to store the received user input and generate a local action signal based on the user input and the received screening signal. Moreover, the computer program further causes the computing device to receive the broadcast programming, store the received broadcast programming, and present the broadcast programming to a user.

The RTSS is generated based on real time monitoring of the broadcast programming being presented in real time. The PSS is generated based on a playback of at least one portion of a recording of the broadcast programming. The RTSS is used to control presentation of the broadcast programming to the user in real time. The PSS is used to control presentation of the broadcast programming to the user as a playback of the stored broadcast programming. The RTSS is generated by reconciling a plurality of screening signals from a plurality of different viewers of the broadcast programming prior to the broadcast programming being presented to the user. The PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

In another illustrative embodiment, a method for screening broadcast programming is provided that comprises receiving a real time screening signal (RTSS) and a precision screening signal (PSS), the RTSS and PSS associated with a broadcast programming, the broadcast programming comprising at least a content of interest (COI) segment. The method further comprises receiving the broadcast programming and receiving user input from a user, the user input comprising at least a COI segment type, wherein the user input further comprises at least an action preference. The method moreover comprises generating a local action signal based on at least one of the RTSS or the PSS and the user input, storing the broadcast programming, and presenting the broadcast programming to a user.

The RTSS is generated based on real time monitoring of the broadcast programming being presented in real time. The PSS is generated based on a playback of at least one portion of a recording of the broadcast programming. The RTSS is used to control presentation of the broadcast programming to the user in real time. The PSS is used to control presentation of the broadcast programming to the user as a playback of the stored broadcast programming. The RTSS is generated by reconciling a plurality of screening signals from a plurality of different viewers of the broadcast programming prior to the broadcast programming being presented to the user. The PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

These and other features and advantages of the present invention will be described in, or will become apparent to those of ordinary skill in the art in view of, the following detailed description of the exemplary embodiments illustrative of the present invention.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art. Moreover, for ease of explanation, the present invention is illustrated with respect to screening video broadcast programming. It will be understood by those skilled in the art that the present invention may be practiced with respect to audio or other broadcast programming without departing from the scope or spirit of the invention.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
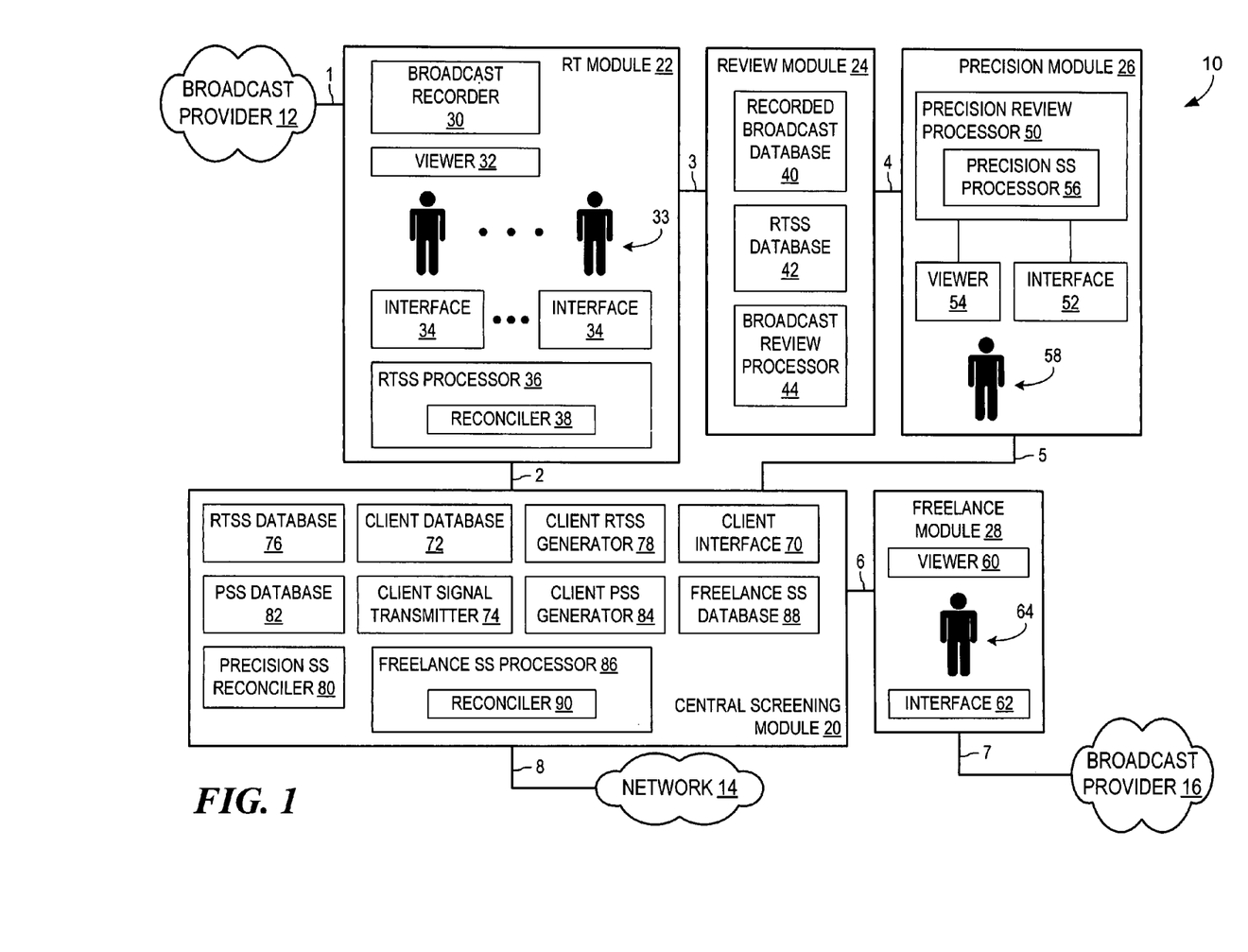
FIG. 1 is a block diagram depicting a broadcast content screening system.

Referring to FIG. 1 of the drawings, reference numeral 10 generally designates a communications system. Communications system 10 includes Central Screening Module 20, Real-Time (RT) Module 22, Review Module 24, Precision Module 26, and Freelance Module 28. RT Module 22 is coupled to and configured to communicate with one or more of a plurality of Broadcast Providers 12 through a first communication channel 1, Central Screening Module 20 through a second communication channel 2, and Review Module 24 through a third communication channel 3. Review Module 24 is coupled to and configured to communicate with RT Module 22 through the third communication channel 3 and Precision Module 26 through a fourth communication channel 4. As illustrated, Review Module 24 is a separate component from Central Screening Module 20. In an alternative embodiment, Review Module 24 is a sub-component of Central Screening Module 20.

Precision Module 26 is coupled to and configured to communicate with Central Screening Module 20 through a fifth communication channel 5 and Review Module 24 through the fourth communication channel 4. Freelance Module 28 is coupled to and configured to communicate with Central Screening Module 20 through a sixth communication channel 6 and one or more of a plurality of Broadcast Providers 16 through a seventh communication channel 7. In an alternative embodiment, Freelance Module 28 is coupled to Central Screening Module 20 via Network 14 (link not shown). Central Screening Module 20 is coupled to and configured to communicate with RT Module 22 through the second communication channel 2, Precision Module 26 through the fifth communication channel 5, Freelance Module 28 through the sixth communication channel 6, and a Network 14 through an eighth communication channel 8. In an alternative embodiment Central Screening Module 20 is also coupled to and configured to communicate with Review Module 24.

RT Module 22 includes Broadcast Recorder 30, Viewer 32, one or more Interfaces 34, and Real-Time Screening Signal (RTSS) Processor 36. In the illustrated embodiment, RT Module 22 is coupled to a Broadcast Provider 12 through communication channel 1, and is configured to receive broadcast programming from Broadcast Provider 12. In an alternative embodiment, RT Module 22 is coupled to one or more of a plurality of Broadcast Providers 12. In another alternative embodiment, RT Module 22 is coupled to one or more of a plurality of Broadcast Providers 12, and one or more of a plurality of Broadcast Recorders 30, as described in more detail below, are configured to store broadcast programming associated with a specific Broadcast Provider 12. In a particular embodiment, each Broadcast Recorder 30 is configured to store broadcast programming from a specific Broadcast Provider 12. In an alternative embodiment, for each Broadcast Provider 12 from which RT Module 22 receives broadcast programming, RT Module 22 includes a Broadcast Recorder 30 configured to store broadcast programming from a single Broadcast Provider 12. It will be understood to one skilled in the art that other configurations can also be employed. Broadcast Provider 12 is any programming provider such as a local television station, broadcast network, cable television provider, Internet broadcast provider, satellite broadcast provider, or other suitable programming provider. Communication channel 1 is a cable television link, wireless link, wire line link, satellite link, Internet connection, infrared link, or other suitable connection suitable to convey broadcast programming.

In operation, RT Module 22 receives broadcast programming from Broadcast Provider 12. Broadcast Recorder 30 receives the broadcast programming, stores the broadcast programming, and transmits the broadcast programming to Viewer 32. Viewer 32 is a television, monitor, or other device suitable to receive and display broadcast programming. In an alternate embodiment, where the broadcast programming is audio programming, Viewer 32 is a radio receiver or other suitable device operable to receive audio programming and emit sounds based on the audio programming. Viewer 32 displays the received broadcast programming to one or more Real-Time (RT) Screeners 33. In the illustrated embodiment, the one or more RT Screeners 33 watch the broadcast programming through a common Viewer 32. In an alternative embodiment, each RT Screener 33 watches the broadcast programming through an associated Viewer 32. In an alternative embodiment, one or more RT Screeners 33 watch the broadcast programming through one or more of a plurality of Viewers 32. As used herein, "each" means all of a particular subset.

RT Screeners 33 are human users who watch the broadcast programming and perform tasks based on the broadcast programming. In particular, RT Screeners 33 watch the broadcast programming and indicate, through an Interface 34, the beginning and ending of content of interest (COI) segments of the broadcast programming. In one embodiment, the COI segments that the RT Screeners 33 indicate is advertising content. In this embodiment, the RT Screeners 33 indicate the beginning and ending of each advertising segment of the broadcast programming, through an Interface 34. It will be understood to those skilled in the art that the COI segments the RT Screeners 33 indicate can be any content or subset of content typically included in broadcast programming, including, for example, violent content, sexual content, local news, advertisements, sports highlights, or other suitable content.

In the illustrated embodiment, each RT Screener 33 performs tasks through an individual associated Interface 34. In other embodiments, one or more of a plurality of RT Screeners 33 share one or more of a plurality of Interfaces 34. In indicating the beginning and ending of COI segments through Interface 34, each RT Screener 33 sends real-time screening information to Real-Time Screening Signal (RTSS) Processor 36. Real-time screening information includes the broadcast programming being watched, including the name of the program, the local broadcast channel, the type of COI segments being identified, the time a particular COI segment begins ("ad start time"), the time a particular COI segment ends ("ad stop time"), a unique RT Screener user identification code (UIC) associated with the RT Screener 33, and any other suitable information. The term "local broadcast channel" as used herein includes information that will uniquely identify the source of the channel. For example, an air channel 4 in Chicago is different from a cable channel 4 on cable service A in Chicago, both of which are different from air an channel 4 in Austin and a cable channel 4 on cable service B in Chicago. Other broadcast programming sources include satellite feeds and broadcasts streamed over the Internet. In any case, sufficient identification is used to uniquely identify all of the broadcasts, and "local broadcast channel" as used herein means all such information needed to identify the program.

In one embodiment, real-time screening information includes session information and COI segment information. In particular, each RT Screener 33 transmits session information to RTSS Processor 36 at the beginning of a viewing period or session that applies to all information or indications during that viewing period or session. Session information includes, for example, the name of the program being watched during the session, the local broadcast channel, the RT Screener UIC, the type of COI segments being identified, and other suitable information. Thereafter, each RT Screener 33 transmits COI segment information indicating either the time a particular COI segment begins or the time the COI segment ends. In one embodiment, each Interface 34 comprises a standard desktop personal computer and each RT Screener 33 sends the session information to RTSS Processor 36 at the beginning of a viewing session and thereafter presses a spacebar of Interface 34 to indicate the beginning and/or end of a particular COI segment. In another embodiment, each RT Screener 33 depresses a toggle button to indicate the beginning and/or end of a particular COI segment.

RTSS Processor 36 is coupled to each of the one or more Interfaces 34. RTSS Processor 36 receives and stores real-time screening information received from each RT Screener 33 through one or more Interfaces 34. RTSS Processor 36 includes Reconciler 38. Reconciler 38 compiles the real-time screening information relating to the beginning and ending times (for example, ad start and ad stop times) received from each RT Screener 33 for each COI segment. There is an inherent delay between the time a particular COI segment begins and the time when an RT Screener 33 recognizes the COI segment as such and transmits the COI segment start time to RTSS Processor 36. Reconciler 38 operates to reconcile the differences in the delays between one or more RT Screeners 33, as indicated by their transmitted COI segment information, to generate reconciled COI segment information.

In this way, the effect of variation in reaction times of each RT Screener 33 is minimized. For example, if one RT Screener 33 observes an advertisement that begins at program time 00:35:00 (zero hours, thirty-five minutes, and zero seconds) and indicates the ad start time at 00:35:03, and another RT Screener 33 observes the same advertisement and indicates the ad start time at 00:35:02.5, Reconciler 38 compiles the two ad start times to generate a reconciled ad start time. In one embodiment, Reconciler 38 computes an average of all ad start times. In the above example, the reconciled ad start time would be program time 00:35:02.75. In an alternative embodiment, Reconciler 38 adjusts an average of all ad start times to account for a predetermined average reaction time. In the above example, for instance, Reconciler 38 subtracts an average reaction time of three seconds from the average ad start time, to yield a reconciled ad start time of 00:54:59.75. In an alternative embodiment, Reconciler 38 is also configured to determine an average reaction time for a particular RT Screener 33 based on a stored history of the indicated COI event times from the RT Screener 33 and the actual (that is, correct) times for the indicated COI event. RTSS Processor 36 compiles the reconciled ad start/stop times generated by Reconciler 38 and other information received from each RT Screener 33 to generate normalized real-time screening information.

RT Module 22 transmits the normalized real-time screening information to Central Screening Module 20 through communication channel 2 and to Review Module 24 through communication channel 3. Communication channel 2 is a wireless link, wire line link, satellite link, Internet connection, infrared link, network link, or other suitable connection. Communication channel 3 is a wireless link, wire line link, satellite link, Internet connection, infrared link, network link, or other suitable connection. RT Module 22 also transmits the stored broadcast programming to Review Module 24.

Review Module 24 is coupled to Precision Module 26 through a fourth communication channel 4. Communication channel 4 is a wireless link, wire line link, satellite link, Internet connection, infrared link, network link, or other suitable connection. Review Module 24 includes Recorded Broadcast Database 40, RTSS Database 42, and Broadcast Review Processor 44. Recorded Broadcast Database 40 is configured to receive broadcast programming from RT Module 22, store the received broadcast programming, and transmit all or part of the stored broadcast programming to Precision Module 26 based on input from Broadcast Review Processor 44. RTSS Database 42 is configured to receive normalized real-time screening information associated with the received broadcast programming from RT Module 22, store the associated normalized real-time screening information, and transmit stored associated normalized real-time screening information to Precision Module 26 based on input from Broadcast Review Processor 44.

Broadcast Review Processor 44 is configured to receive review requests from Precision Module 26 and provide input to Recorded Broadcast Database 40 and RTSS Database 42 based on requests from Precision Module 26. In operation, Broadcast Review Processor 44 receives a review request from Precision Module 26. The review request includes information relating to particular broadcast programming and COI segment identification for review by Precision Module 26, as described in more detail below. Broadcast Review Processor 44 identifies the requested broadcast programming and associated normalized real-time screening information, directs Recorded Broadcast Database 40 to transmit the requested broadcast programming to Precision Module 26, and directs RTSS Database 42 to transmit the associated normalized real-time screening information to Precision Module 26.

Precision Module 26 includes Precision Review Processor 50, Interface 52, and Viewer 54. Precision Review Processor 50 includes Precision Screening Signal (PSS) Processor 56. Precision Review Processor 50 is configured to receive input from a Precision Screener 58 through Interface 52, generate and transmit a review request to Review Module 24 based on the received input, receive requested broadcast programming and associated normalized real-time screening information from Review Module 24, and display the requested broadcast programming and associated normalized real-time screening information to Precision Screener 58 through Interface 52 and Viewer 54. In one embodiment, Interface 52 is a standard desktop personal computer. Viewer 54 is a television, monitor, or other device suitable to receive and display broadcast programming.

In operation, a Precision Screener 58 provides input through Interface 52 to Precision Review Processor 50 requesting COI segment information for a particular broadcast program. The input identifies the requested information based one or more criteria, including the broadcast programming channel, the time of day the broadcast programming was originally broadcast, the type of COI segment observed, the RT Screener UIC, or other suitable basis. For example, Precision Screener 58 can request information relating to advertisements identified on channel four during the nine o'clock p.m. program hour of Jun. 24, 2003.

Precision Review Processor 50 generates and transmits a review request to Review Module 24 based on the input received from Precision Screener 58. Precision Review Processor 50 receives the requested broadcast programming and associated normalized real-time screening information and displays the requested broadcast programming, or a portion thereof, to Precision Screener 58 through Viewer 58 along with the associated normalized real-time screening information through Interface 52. In one embodiment, the requested broadcast programming includes associated time markings. Time markings include, for example, Society of Motion Picture and Television Engineers (SMPTE) Time Codes, Musical Instrument Digital Interface (MIDI) Time Codes (MTC), or other suitable markings. The associated time markings are employed in Review Module 24 to assist in determining the appropriate start and end times for a COI segment.

Precision Review Processor 50 is also configured to receive playback control input from Precision Screener 58 through Interface 52, allowing Precision Screener 58 to control the display of the requested broadcast programming. The playback control input includes commands to play, pause, rewind, fast forward, slow forward, frame advance, and frame rewind the programming, and other suitable commands. Precision Screener 58 uses the playback control commands and the associated normalized real-time screening information to determine the precise beginning and ending of a particular COI segment ("precision COI segment information"). Precision Screener 58 transmits the precision COI segment information to Precision Review Processor 50 through. Interface 52. Precision Review Processor 50 receives the precision COI segment information and generates precision screening information based on the precision COI segment information and the associated normalized real-time screening information.

In an example operation, Precision Review Processor 50 displays ten seconds of broadcast programming before and after a first identified COI segment of a broadcast program and the associated normalized real-time screening information to a Precision Screener 58. It will be understood to one skilled in the art that other suitable bracketing time can also be employed. For an advertisement that begins at program time 00:35:00 (zero hours, thirty-five minutes, and zero seconds) and an associated reconciled ad start time at 00:35:02.75, Precision Review Processor 50 displays programming content from time 00:34:52.75 to 00:35:12.75. Using the playback control commands, Precision Screener 58 observes the precise ad start time of 00:35:00 and indicates the precise ad start time to Precision Review Processor 50 through Interface 52. Thus, the effects of reaction time delay of RT Screeners 33, as described above, are significantly reduced or eliminated.

Precision Review Processor 50 includes Precision Screening Signal (SS) Processor 56. Precision SS Processor 56 is configured to associate the precision screening information with the broadcast programming, and to transmit the associated precision screening information to Central Screening Module 20. Precision Review Processor 50 is coupled to Central Screening Module 20 through communication channel 5. Communication channel 5 is a wireless link, wire line link, satellite link, Internet connection, infrared link, network link, or other suitable connection. In the illustrated embodiment, a single Precision Module 26 is shown. In an alternative embodiment, communications system 10 includes a plurality of Precision Modules 26, and each Precision-Module 26 is coupled to Central Screening Module 20. In an alternative embodiment, Precision Module 26 includes a plurality of Interfaces 52 and Viewers 54 each associated with one or more of a plurality of Precision Screeners 58.

Communications system 10 also includes Freelance Module 28. Freelance Module 28 is coupled to Central Screening Module 20 through communication channel 6 and to one or more Broadcast Providers 16 through communication channel 7, and is configured to receive broadcast programming from a Broadcast Provider 16. Broadcast Provider 16 is any programming provider such as a local television station, broadcast network, cable television provider, Internet broadcast provider, satellite broadcast provider, or other suitable programming provider. Communication channel 6 is a wireless link, wire line link, satellite link, Internet connection, infrared link, network link, or other suitable connection. Communication channel 7 is a cable television link, wireless link, wire line link, satellite link, Internet connection, infrared link, network link or other suitable connection. Freelance Module 28 includes one or more Viewers 60 and one or more Interfaces 62. Viewer 60 is a television, monitor, or other device suitable to receive and display broadcast programming. Interface 62 is a desktop computer, a keyboard, a toggle switch, a custom feedback device, or other suitable interface.

In operation, Freelance Module 28 receives broadcast programming from a Broadcast Provider 16. Viewer 60 displays the received broadcast programming to one or more Freelance Screeners 64. One or more Freelance Screeners 64 watch the broadcast programming through an associated Viewer 60. In an alternative embodiment, one or more Freelance Screeners 64 watch the broadcast programming as a group through a single Viewer 60.

Freelance Screeners 64 are human users who watch broadcast programming and perform tasks based on the broadcast programming. In particular, Freelance Screeners 64 watch broadcast programming and transmit freelance screening signal (FSS) information, through an associated Interface 62, in a similar manner as RT Screeners 33 of RT Module 22. FSS information includes information regarding the broadcast programming being watched, including the name of the program, the local broadcast channel, the type of COI segments being identified, the time a particular COI segment begins (for example, ad start time), the time a particular COI segment ends (for example, ad stop time), a unique Freelance Screener user identification code (UIC) associated with a particular Freelance Screener 64, and any other suitable information.

In one embodiment, FSS information includes session information and COI segment information. In particular, in a manner similar to RT Screeners 33 of RT Module 22, each Freelance Screener 64 transmits session information to Central Screening Module 20 at the beginning of a viewing session that applies to all information or indications during that session. Session information includes, for example, the name of the program being watched during the session, the local broadcast channel, the unique Freelance Screener UIC, and the type of COI segments being identified. Thereafter, each Freelance Screener 64 transmits COI segment information indicating either the time a particular COI segment begins or the time the segment ends. In one embodiment, Interface 62 comprises a standard desktop personal computer and each Freelance Screener 64 sends the session information to Central Screening Module 20 at the beginning of a viewing session and thereafter presses a spacebar of Interface 62 to indicate the beginning and/or end of a particular COI segment. In another embodiment, each Freelance Screener 64 depresses a toggle button to indicate the beginning and/or end of a particular COI segment.

In the illustrated embodiment, Freelance Module 28 is coupled to Central Screening Module 20 through communication channel 6. In an alternative embodiment, communication channel 6 is an Internet connection and Interface 62 is a graphical user interface (GUI) operating on a personal computer. In an alternative embodiment, Freelance Module 28 is coupled to Central Screening Module 20 through Network 14. In an alternative embodiment, communications system 10 includes a plurality of Freelance Modules 28, each Freelance Module 28 comprising a single Viewer 60 and Interface 62 associated with a single Freelance Screener 64.

Communications system 10 also includes Central Screening Module 20. Central Screening Module 20 includes Client Interface 70, Client Database 72, Client Signal Transmitter 74, Real Time Screening Signal (RTSS) Database 76, Client RTSS Generator 78, Precision SS Reconciler 80, Precision SS Database 82, Client Precision Screening Signal (PSS) Generator 84, Freelance Screening Signal (SS) Processor 86, and Freelance SS Database 88. Central Screening Module 20 is coupled to a Network 14 through communication channel 8. Communication channel 8 is a wireless link, wire line link, satellite link, Internet connection, infrared link, network link, or other suitable connection. Network 14 is any computer and/or communication network including, but not limited to the Internet, intranets, the Public Switched Telephone Network (PSTN), local area networks (LANs), wide area networks (WANs), or metropolitan area networks (MANs).

Client Interface 70 is configured to receive client input from a client through Network 14. Client Interface 70 is a graphical user interface (GUI) or other suitable interface for receiving input from a user. Client input includes a name, street address, credit card information, an Internet address, an email address, a wireless pager number, other identifying information, screening preference information, and/or other suitable information from a client. A client is a human user operating or in possession of a suitable device configured to communicate with Central Screening Module 20 and use the various screening signals generated by Central Screening Module 20, as described in more detail below. Screening preference information includes information relating to the types of COI segments the client wishes to monitor, the channels the client watches, and other suitable information. Client Interface 70 is also configured to receive clock synchronization information from the client employing any of several well-known methods for synchronizing clocks. Central Screening Module 20 is configured to ensure that all components of the system are synchronized with respect to Central Screening Module 20, and to employ the received clock synchronization to ensure that all information received from and sent to the client is synchronized with respect to the client.

Client Interface 70 is also configured to communicate with and transmit client input to Client Database 72. Client Database 72 is a hard drive, tape drive, or other suitable storage media and is configured to store, organize, and communicate upon request the stored client input. RTSS Database 76 is a hard drive, tape drive, or other suitable storage media and is configured to receive associated normalized real-time screening information from RT Module 22, store the associated normalized real-time screening information, and transmit stored associated normalized real-time screening information to Client RTSS Generator 78.

Precision SS Reconciler 80 is configured to receive associated precision screening information from one or more Precision Modules 26, to reconcile any differences between associated precision screening information received from disparate Precision Modules 26, if any, and to transmit reconciled precision screening information to PSS Database 82. In reconciling any differences between associated precision screening information received from disparate Precision Modules 26, Precision SS Reconciler 80 operates in a similar manner as Reconciler 38 of RT Module 22, described above. PSS Database 82 is a hard drive, tape drive, or other suitable storage media and is configured to receive reconciled associated precision screening information from Precision SS Reconciler 80, store the reconciled associated precision screening information, and transmit stored reconciled associated precision screening information to Client PSS Generator 84.

Freelance SS Processor 86 is configured to receive FSS information from one or more Freelance Modules 28. Freelance SS Processor 86 includes Reconciler 90. Reconciler 90 compiles FSS information received from disparate Freelance Modules 28, in a manner similar to Reconciler 38 of RT Module 22, to generate normalized FSS information. Freelance SS Processor 86 is configured to transmit normalized FSS information to Freelance SS Database 88. Freelance SS Database 88 is a hard drive, tape drive, or other suitable storage media and is configured to receive normalized FSS information from Freelance SS Processor 86, store the normalized FSS information, and transmit stored normalized FSS information to Client RTSS Generator 78.

Client RTSS Generator 78 is configured to generate a Real-Time Screening Signal (RTSS) based on input from RTSS Database 76, Freelance SS Database 88, and Client Database 72, and to transmit the RTSS to Client Signal Transmitter 74. In particular, Client RTSS Generator 78 retrieves client input from Client Database 72. Based on the client input, Client RTSS Generator 78 retrieves normalized associated real-time screening information from RTSS Database 76 and normalized FSS information from Freelance SS Processor 86. Client RTSS Generator 78 compiles the normalized associated real-time screening information and the normalized FSS information to generate reconciled associated real-time screening information. Based on the client input and the reconciled associated real-time screening information, Client RTSS Generator 78 generates an RTSS.

Client PSS Generator 84 is configured to generate a Precision Screening Signal (PSS) based on input from PSS Database 82 and Client Database 72, and to transmit the PSS to Client Signal Transmitter 74. In particular, Client PSS Generator 84 retrieves client input from Client Database 72. Based on the retrieved client input, Client PSS Generator 84 retrieves reconciled associated precision screening information from PSS Database 82. Based on the retrieved client input and reconciled associated precision screening information, Client PSS Generator 84 generates a PSS.

Client Signal Transmitter 74 is configured to receive an RTSS from Client RTSS Generator 78, to receive a PSS from Client PSS Generator 84, and to transmit the RTSS and PSS to a client system through Network 14. In the illustrated embodiment, the RTSS and PSS include client identification to direct the signals to a specific client system, Internet address, email address, or other suitable destination. In another embodiment, the RTSS and PSS signals are transmitted over a wireless broadcast network, such as a pager network, without a client-specific destination. In an alternative embodiment, Client Signal Transmitter 74 is configured to encrypt RTSS and PSS signals to prevent theft of services.

Thus, communication system 10 is generally configured to monitor broadcast programming, to generate screening information based on the broadcast programming, to generate screening signals based on the screening information, and to transmit screening signals. Generally, screening signals are signals or other communications configured to convey screening information and include signals transmitted between components of communication system 10, such as, for example, transmissions from RT Module 22 to Central Screening Module 20 conveying normalized real-time screening information or other screening information, transmissions from RT Module 22 to Review Module 24, transmissions from Review Module 24 to Precision Module 26, transmissions from Precision Module 26 to Central Screening Module 20 conveying associated precision screening information or other screening information, transmissions from Freelance Module 28 to Central Screening Module 20 conveying freelance screening signals, freelance screening signal information, or other screening information, Real-Time Screening Signals, and Precision Screening Signals. As described in more detail below, screening signals also include signals transmitted between components of communications system 100 of FIG. 2, such as, for example, local action signals and other suitable screening signals.

Figure 2:
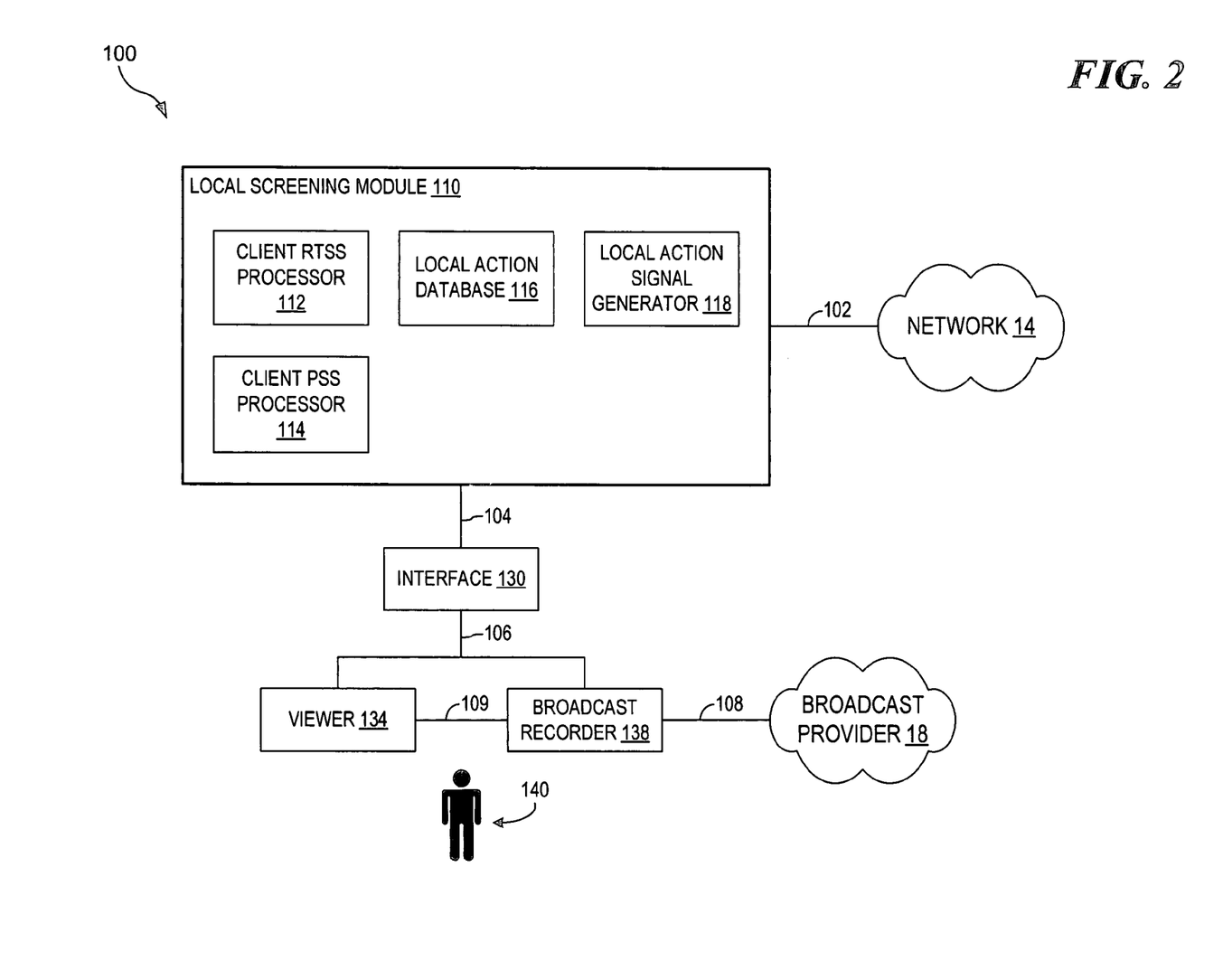
FIG. 2 is a block diagram depicting another aspect of a broadcast content screening system.

Referring to FIG. 2 of the drawings, the reference numeral 100 generally designates a communications system. Communications system 100 includes local screening module 110, interface 130, viewer 134, and broadcast recorder 138. Local screening module 110 is coupled to network 14 through communication channel 102, and is configured to receive PSS and RTSS signals from network 14. Interface 130 is coupled to local screening module 110 through communication channel 104 and is configured to receive local action signals (LAS) from local screening module 110 and preference information from a Client 140. Communication channels 102 and 104 are any suitable communication channel including, for example, a wireless link, a wire line link, an infrared (IR) link, a radio frequency (RF) link, a fiber optic link, an Internet connection, or any other suitable connection.

Interface 130 is also coupled to a viewer 134 and a broadcast recorder 138 through communication channel 106, and is configured to control the operation of viewer 134 and broadcast recorder 138. Communication channel 106 is any suitable communications link including, for example, a wireless link, a wire line link, an infrared (IR) link, a radio frequency (RF) link, a fiber optic link, an Internet connection, or any other suitable connection. Broadcast recorder 138 is coupled to a broadcast provider 18 through communication channel 108 and to viewer 134 through communication channel 109, and is configured to receive real-time broadcast programming from broadcast provider 18, to store real-time broadcast programming, and to deliver real-time broadcast programming and stored broadcast programming to viewer 134. Communication channels 108 and 109 are any suitable communication channel including, for example, a wireless link, a wire line link, an infrared (IR) link, a radio frequency (RF) link, a fiber optic link, an Internet connection, or any other suitable connection. Client 140 watches broadcast programming through viewer 134, provides preference information and client input to local screening module 110 through interface 130, and controls operation of viewer 134 and broadcast recorder 138. In the illustrated embodiment, local screening module 110, interface 130, viewer 134, and broadcast recorder 138 are depicted as separate, discrete components. In an alternative embodiment, one or more of local screening module 110, interface 130, viewer 134, and broadcast recorder 138 can be combined into a single device or module, one or more separate devices or modules, or otherwise suitably combined. For example, in one embodiment, local screening module 110 and interface 130 are combined into a single device. In an alternative embodiment, viewer 134 includes local screening module 110 and interface 130. In an alternative embodiment, broadcast recorder 138 includes local screening module 110 and interface 130. In an alternative embodiment, interface 130 and viewer 134 are graphical user interfaces (GUIs), local screening module 110 and broadcast recorder 138 are embodied as computer program code, and local screening module 110, interface 130, viewer 134, and broadcast recorder 138 are configured to screen Internet-based broadcast programming. In an alternative embodiment, local screening module 110 is embodied as computer program code. In an alternative embodiment, local screening module 110 and interface 130 are embodied as computer program code. It will be understood to one skilled in the art that other configurations can also be employed.

Local screening module 110 includes Client RTSS Processor 112, Client PSS Processor 114, local action database 116, and local action signal (LAS) generator 118. In operation, local screening module 110 receives PSS and RTSS signals and generates local action signals (LAS) based on the received PSS and RTSS signals and information from local action database 116. In particular, when local screening module 110 receives an RTSS signal, Client RTSS Processor 112 extracts reconciled associated real-time screening information from the RTSS signal. As described above, the reconciled associated real-time screening information includes channel information, COI segment information, broadcast programming information, and other suitable information. For example, in one embodiment, the reconciled associated real-time screening information includes a broadcast channel, a broadcast programming start time, a broadcast programming end time, a plurality of ad start times, a plurality of ad stop times, and general information regarding the programming itself (for example, the programming type, cast, plot summary, etc.). Client RTSS Processor 112 transmits the reconciled associated real-time screening information to the local action signal generator 118.

Local action signal generator 118 is also configured to receive local preference information from local action database 116. Local action database 116 is a hard drive, tape drive, or other suitable storage media and is configured to receive local preference information from interface 130, to store the local preference information, and to transmit the local preference information to local action signal generator 118 in response to a request. Generally, local preference information indicates what actions client 140 wishes the system to take in response to certain types of COI segments. For example, local action information can include the client's preference that when an advertising segment begins, the viewer 134 switches to a local weather channel, returning to the broadcast programming when the advertising segment ends. Local action information can also include client preferences for handling PSS and RTSS information. For example, local action information can include the client's preference that RTSS information be employed when the client is watching a broadcast-program in real-time, and that PSS information be employed, if available, when the client watches a recorded broadcast program, and that PSS information be employed to edit a recorded broadcast program when the PSS information is received, regardless of whether the client has viewed the recorded broadcast program, or other suitable preferences. In a particular embodiment, employing PSS information to edit a recorded broadcast program includes removing or deleting unwanted portions or segments of a recorded broadcast program and retaining the desired portions or segments of a recorded broadcast program. In an alternative embodiment, employing PSS information to edit a recorded broadcast program includes splicing together the desired portions or segments of a recorded broadcast program. Local action database 116 transmits the local preference information to local action signal generator 118.

Local action signal generator 118 receives reconciled associated real-time screening information from Client RTSS Processor 112 and, based on the received reconciled associated real-time screening information, requests local preference information from local action database 116. Local action signal generator 118 receives the local preference information from local action database 116 and generates a local action signal (LAS) based on the local preference information and reconciled associated real-time screening information. For example, if the reconciled associated real-time screening information indicates that an advertising segment on channel 4 begins at time 00:35:03 and ends at time 00:36:03, and the local preference information indicates that client 140 wishes to switch to channel 24 during advertising segments, the LAS would direct the viewer 134 to switch to channel 24 at time 00:35:03 and to return to channel 4 at time 00:36:03. In another example, if the screening information indicates that an advertising segment on channel 4 begins at time 00:35:03 and ends at time 00:36:03, and the local preference information indicates that client 140 wishes to pause recording of channel 4 during advertising segments, the LAS would direct the broadcast recorder 138 to stop recording at time 00:35:03 and resume recording at time 00:36:03. In an alternative embodiment, the LAS is configured to adjust action times to account for inherent delays associated with real-time screening information, as described in more detail below. For example, the LAS can be configured to direct the broadcast recorder 138 to record continuously during the broadcast programming, and note the real-time-based start and stop times for use during playback of recorded broadcast programming. Thus, the potential for losing desirable content can be minimized.

Client PSS Processor 114 operates in a similar manner as Client RTSS Processor 112. Client PSS Processor 114 extracts reconciled associated precision screening information from a received PSS signal. As described above, the reconciled associated precision screening information includes channel information, COI segment information, broadcast programming information, and other suitable information. For example, in one embodiment, the reconciled associated precision screening information includes a broadcast channel, a broadcast programming start time, a broadcast programming end time, a plurality of ad start times, a plurality of ad stop times, and general information regarding the programming itself (for example, programming type, cast, plot summary, etc.). Client PSS Processor 114 transmits the reconciled associated precision screening Information to the local action signal generator 118.

Local action signal generator 118 receives and processes the precision screening information received from Client PSS Processor 114. In particular, local action signal generator 118 receives reconciled associated precision screening information from Client PSS Processor 114 and, based on the reconciled associated precision screening information, requests local preference information from local action database 116. Local action signal generator 118 receives the local preference information from local action database 116 and generates a local action signal (LAS) based on the local preference information and reconciled associated precision screening information. Local action signal generator 118 transmits the LAS to Interface 130. Interface 130 controls viewer 134 and/or broadcast recorder 138 based on the LAS. In an alternative embodiment, viewer 134 includes local action database 110 and interface 130 and the local action signals are internal signals within viewer 134. In an alternative embodiment, broadcast recorder 138 includes local action database 110 and interface 130 and the local action signals are internal signals within broadcast recorder 138.

In operation, RTSS signals and their associated LAS signals are processed in real-time, that is, while Client 140 is watching the subject broadcast programming on Viewer 134 or while broadcast recorder 138 is recording the subject broadcast programming. Accordingly, there is an inherent delay between the COI segment start time as transmitted in the RTSS and when the LAS signal is generated and the interface 130 takes action based on the LAS signal. For example, at time 00:35:00 a COI segment begins. At time 00:35:03, an RT Screener 33 (of FIG. 1) indicates the beginning of a COI segment and at time 00:35:05 an RTSS signal is generated and transmitted as a result of the input from RT Screener 33 (see FIG. 1). Local screening module 110 receives the RTSS at time 00:35:09 and transmits a corresponding LAS at time 00:35:12. Interface 130 takes action on the LAS signal at time 00:35:13. A similar delay exists between a COI segment end time and interface action. Accordingly, local screening module 110 can be configured to generate LAS signals directing a return to the original channel or resuming recording after a predetermined time, in order not to miss any non-COI programming.

PSS signals, however, are based on Precision Screener input and are not ordinarily generated in real-time, as described above. Accordingly, LAS signals based on PSS signals are ordinarily directed to broadcast recorder 138 as an update or correction to previously issued RTSS-based LAS signals. For example, if a previously issued RTSS-based LAS directed broadcast recorder 138 to stop recording at time 00:35:03, and a PSS-based LAS signal directs broadcast recorder 138 to stop recording at time 00:35:00, broadcast recorder 138 can delete the stored content between time 00:35:00 and 00:35:03. In this way, a client 140 watching a delayed broadcast program can receive more accurate service based on the updated LAS actions. In one embodiment, client 140 can configure broadcast recorder 138 to store, and replay after a designated time has elapsed, all broadcast programming on the channel being watched by client 140, thereby introducing a specific delay between when broadcast programming is received and when the received broadcast programming is presented to client 140. In one embodiment, the specific delay designated by client 140 is based on an estimated or promised time between when the RTSS signals are received and the related PSS signals are received. In this way, where, for example, a service provider offering RTSS and PSS signals has pledged to its customers that the PSS signals will be received within, for example, five minutes of the RTSS signals, client 140 can configure communication system 100 to delay presentation of received broadcast programming for six minutes, in order to take advantage of the more accurate PSS signals.

In the illustrated embodiment, the RTSS-based local action signals and PSS-based local action signals directs broadcast recorder 138 to start or stop recording during COI segments. In an alternative embodiment, broadcast recorder 138 stores an entire broadcast program, including associated COI segments. When client 140 watches a recorded broadcast program, associated COI segments are skipped (for example, where broadcast recorder 138 stores an electronic copy of the broadcast program) and/or displayed at a fast speed (for example, where broadcast recorder 138 stores a copy of the broadcast program on a videotape). In an alternative embodiment, broadcast recorder 138 stores associated COI segments until PSS information is received, at which point broadcast recorder 138 edits in or out the associated COI segments based on the received PSS information and deletes any COI segments edited out, thereby releasing storage resources for additional broadcast programming storage. Thus, when client 140 watches a recorded broadcast program, the presentation will be either a RTSS-based version, where the COI segments are skipped, or a PSS-based version, where the COI segments have been edited out altogether, depending on how long after a broadcast program is recorded that client 140 view the recorded broadcast program, and whether the associated PSS information has been received and/or processed by broadcast recorder 138. It will be understood by one skilled in the art that other configurations and playback options can also be employed. Moreover, such other configurations and playback options can be embedded or otherwise included in the local preference information stored in local action database 116, or otherwise suitable stored.

Figure 3:
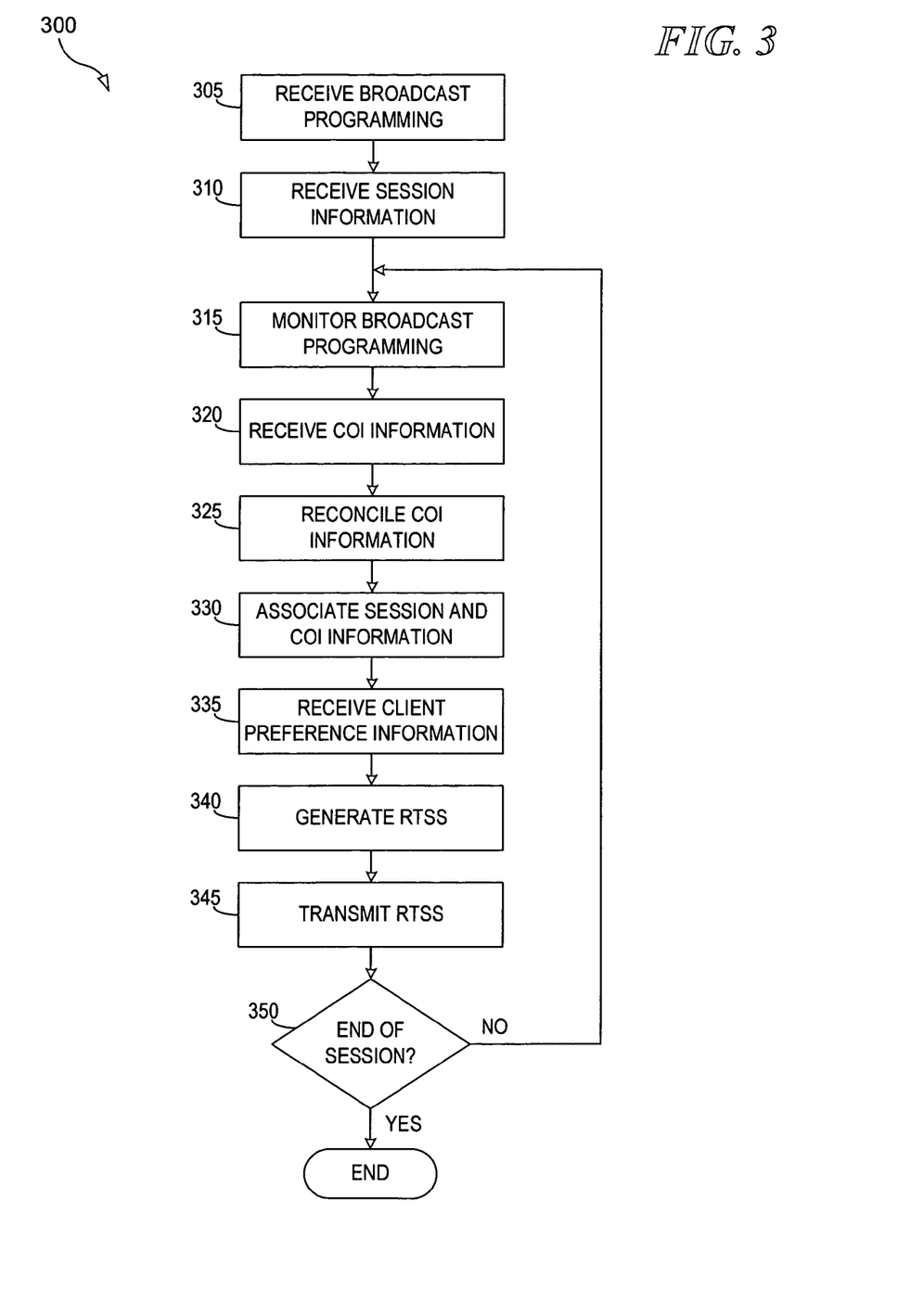
FIG. 3 is a flow diagram depicting a broadcast content screening method.

Referring to FIG. 3 of the drawings, the reference numeral 300 generally designates a flow chart depicting a method for broadcast content screening. In step 305, broadcast programming is received. This step is performed by RT Module 22 and/or Freelance Module 28 of FIG. 1. In step 310, session information is received based on the broadcast programming. This step is performed by RTSS Processor 36 of FIG. 1 in response to input from an RS Screener 34 of FIG. 1, as described above. This step can also be performed by Freelance SS Processor 86 of FIG. 1 in response to input from a Freelance Screener 64, as described above.

In step 315, the broadcast programming is monitored for content of interest (COI) segments. This step is performed by RS Screener 34 and/or Freelance Screener 64 of FIG. 1. In step 320, COI segment information is received. This step is performed by RTSS Processor 36 of FIG. 1 in response to input from an RS Screener 34 of FIG. 1, as described above. This step can also be performed by Freelance SS Processor 86 of FIG. 1 in response to input from a Freelance Screener 64, as described above.

In step 325, the received COI segment information is reconciled to generate reconciled COI segment information. This step is performed by Reconciler 38 and/or Reconciler 90 of FIG. 1, as described above, based on whether the COI segment information was received by RTSS Processor 36 or Freelance SS Processor 86, respectively. In step 330, the reconciled COI segment information is associated with the session information and the received broadcast programming to generate normalized associated real-time screening information (or normalized FSS information, as appropriate), and the normalized associated real-time screening information (or normalized FSS information, as appropriate) is stored. This step is performed by RTSS Processor 36 and/or Freelance SS Processor 86 of FIG. 1, with the normalized associated real-time screening information or normalized FSS information stored in RTSS Database 76 and Freelance SS Database 88 of FIG. 1, respectively, as described above.

In step 335, client preference information is received based on client input to generate screening preference information. Step 335 is performed by Central Screening Module 20 of FIG. 1, as described above. It will be understood that step 335 can be performed before any of the previous steps. In particular, Central Screening Module 20 can receive client input before the process begins, and in step 335, retrieve the client screening preference information from Client Database 72.

In step 340, an RTSS signal is generated based on the client screening preference information and the normalized associated real-time screening information and/or normalized FSS information. This step is performed by Client RTSS Generator 78 of FIG. 1, as described above. In step 345, the RTSS signal is transmitted to the client for processing. This step is performed by Client Signal Transmitter 74, as described above. At decisional step 350, a determination is made whether the monitoring session is complete (for example, when the broadcast programming has concluded). This step is performed by RTSS Processor 36 of FIG. 1. If at decisional step 350 the session is not complete, the process continues along the NO branch, returning to step 315, wherein the broadcast programming is monitored. In the illustrated embodiment, step 315 (monitoring the broadcast programming) typically continues during steps 320 through 350, until the monitoring session ends. If at decisional step 350 the session is complete, the process continues along the YES branch and the process ends.

Figure 4:
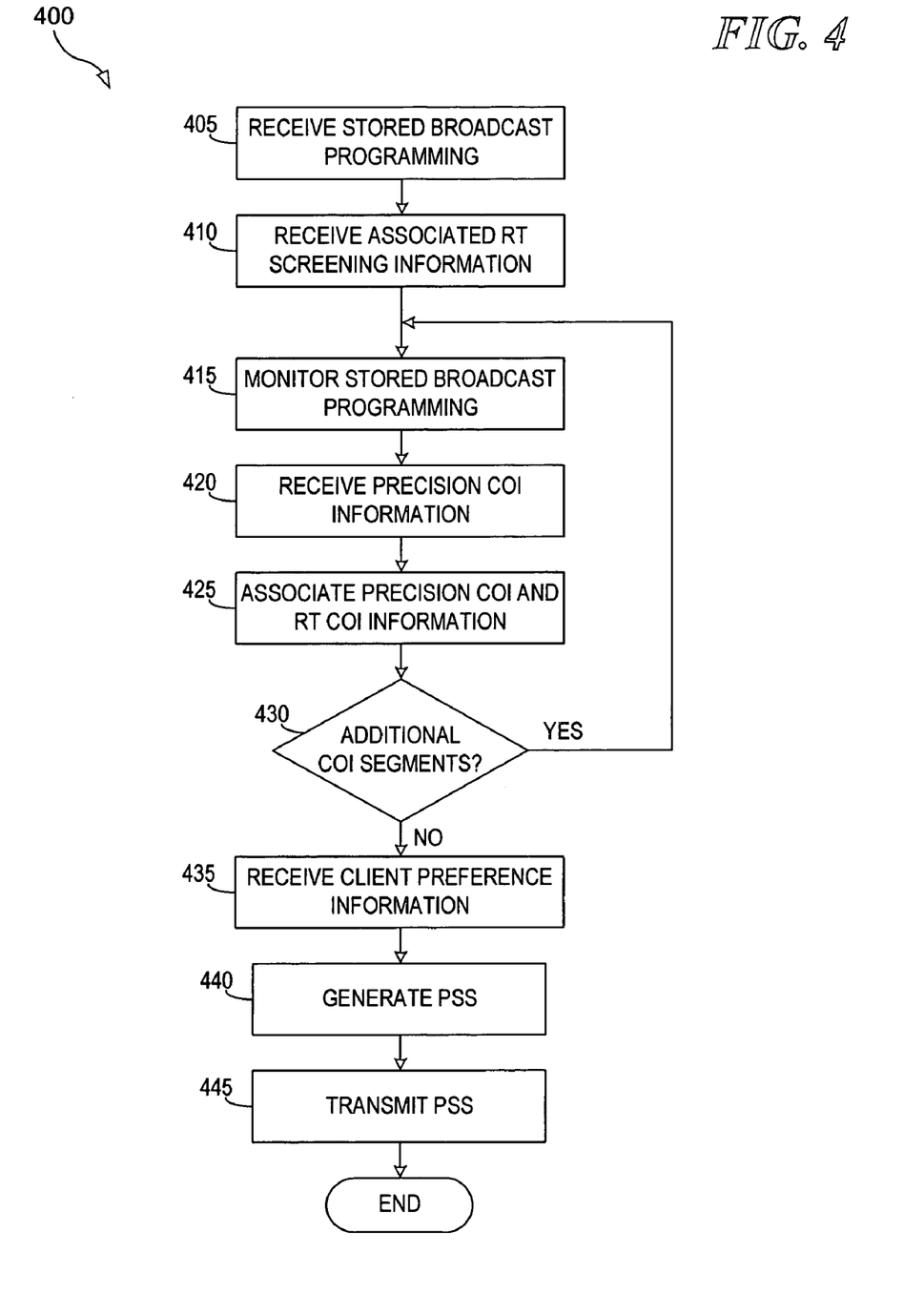
FIG. 4 is a flow diagram depicting another broadcast content screening method.

Referring to FIG. 4 of the drawings, the reference numeral 400 generally designates a flow chart depicting a method for broadcast content screening. In step 405, stored broadcast programming is received. This step is performed by Precision Module 26 of FIG. 1, based on interaction with Review Module 24, as described above. In step 410, normalized associated real-time screening information is received. This step is performed by Precision Module 26 of FIG. 1, based on interaction with Review Module 24, as described above.

In step 415, the stored broadcast programming is monitored, based on the received normalized associated real-time screening information. This step is performed by Precision Screener 58 of FIG. 1, as described above. In step 420, precision COI segment information is received. This step is performed by Precision Review Processor 50 of FIG. 1 in response to input from a Precision Screener 58 of FIG. 1, as described above. In step 425, the precision COI segment information is associated with the stored broadcast programming to generate associated precision screening information, which is transmitted to Central Screening Module 20 and stored in PSS Database 82, as described above. This step is performed by Prevision Review Processor 50 and Precision SS Processor 56 of FIG. 1, as described above. In an alternate embodiment, where there are a plurality of Precision Modules 26, the associated precision screening information is transmitted to Precision SS Reconciler 80 of FIG. 1. The associated precision screening information is reconciled with other associated precision screening information received from other Precision Modules 26 to generate reconciled associated precision screening information, and the reconciled associated precision screening information is stored in PSS Database 82, as described above.

In decisional step 430, a determination is made whether there are additional COI segments to identify. If there are additional COI segments to identify, the process continues along the YES branch, returning to step 415. In one embodiment, this step is performed by Precision Review Processor 50 of FIG. 1 based on the normalized associated real-time screening information. That is, Precision Review Processor 50 automatically presents COI segments to Precision Screener 58 in a sequence until all of the associated COI segments have been processed. In another embodiment, this step is performed by Precision Screener 58, based on the normalized associated real-time screening information.

If in decisional step 430 there are no additional COI segments to identify, the process continues along the NO branch to step 435. In step 435, client preference information is received based on client input to generate screening preference information. Step 435 is performed by Central Screening Module 20 of FIG. 1, as described above. It will be understood that step 435 can be performed before any of the previous steps. In particular, Central Screening Module 20 can receive client input before the process begins, and in step 435, retrieve the client screening preference information from Client Database 72.

In step 440, a PSS signal is generated based on the client screening preference information and the associated precision screening information (or reconciled associated precision screening information, as appropriate), as described above. This step is performed by Client RTSS Generator 78 of FIG. 1, as described above. In step 445, the PSS signal is transmitted to the client for processing, and the process ends. This step is performed by Client Signal Transmitter 74, as described above.

Figure 5A:
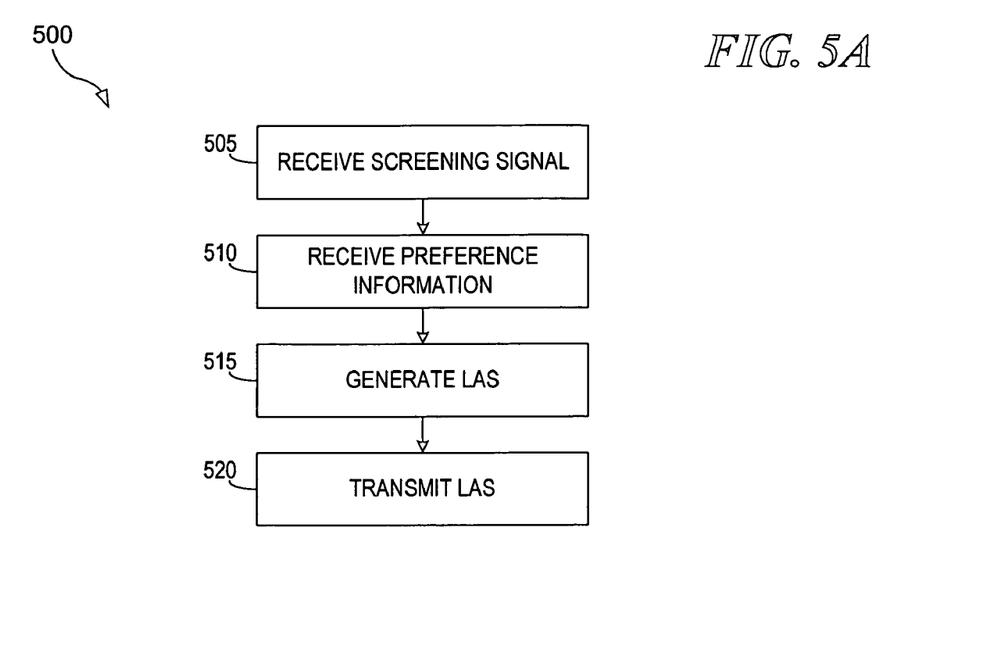
FIGS. 5A-5B are flow diagrams depicting another broadcast content screening method.

Referring to FIG. 5A of the drawings, the reference numeral 500 generally designates a flow chart depicting a method for broadcast content screening. In step 505, a screening signal is received. This step is performed by Local Screening Module 110 of FIG. 2, as described above. As described above, the screening signal is a PSS or RTSS signal. In step 510, local preference information is received based on client input. This step is performed by Interface 130 of FIG. 2 and the local preference information is stored in Local Action Database 116 of FIG. 2, as described above. It will be understood that step 510 can be performed before step 505. In particular, Local Screening Module 110 can receive client input before the process begins, and in step 510, retrieve the local preference information from Local Action Database 116.

In step 515, a LAS signal is generated based on the screening signal and the local preference information. This step is performed by Local Action Signal Generator 118 of FIG. 2, as described above. In step 520, the LAS is transmitted and the process ends. This step is performed by Local Action Signal Generator 118 of FIG. 2, as described above.

Figure 5B:
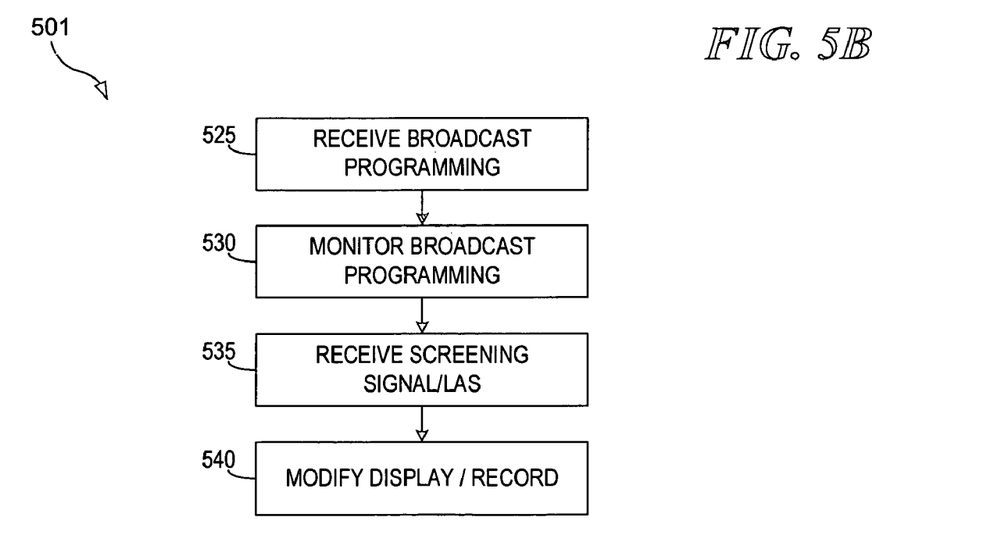

Referring to FIG. 5B of the drawings, the reference numeral 501 generally designates a flow chart depicting a method for broadcast content screening. In step 525, broadcast programming is received. This step is performed by Broadcast Recorder 138 of FIG. 2. In one embodiment, Broadcast Recorder 138 also passes the broadcast programming directly through to Viewer 134. In another embodiment, this step is performed by Viewer 134 of FIG. 2, as described above.

In step 530, the broadcast programming is monitored. In one embodiment, this step is performed by Broadcast Recorder 138 of FIG. 2 storing (recording) the broadcast programming. In another embodiment, this step is performed by Viewer 134 of FIG. 2 displaying the broadcast programming. In step 535, a LAS signal is received. This step is performed by Interface 130 of FIG. 2, as described above. In step 540, action is taken based on the received LAS signal. In one embodiment, this step is performed by Interface 130 of FIG. 2 controlling Broadcast Recorder 138 of FIG. 2 and the action taken includes pausing recording, resuming recording, ceasing recording, recording another channel, or other suitable action, as described above. In another embodiment, this step is performed by Interface 130 of FIG. 2 controlling Viewer 134 of FIG. 2 and the action taken includes reducing audio volume associated with the broadcast programming, switching display to another channel, or other suitable action, as described above. After step 540, the process returns to step 525, wherein broadcast programming is received.

The process repeats as described above until interrupted by client 140, such as, for example, by switching off broadcast recorder 138 and/or viewer 134 of FIG. 2. In an alternative embodiment, step 525 encompasses playback of a recorded broadcast program. In an alternative embodiment, stored broadcast programming is edited in accordance with a plurality of received LAS signals and steps 525 through 540 are performed internally by broadcast recorder 138.

In an alternative embodiment, one or more of the steps of the method depicted in FIG. 5A are incorporated into the method depicted in FIG. 5B. For example, in an embodiment where viewer 134 of FIG. 2 includes local action module 110 and interface 130 of FIG. 2, viewer 134 performs the steps of the methods depicted in FIG. 5A and FIG. 5B. In an alternative embodiment, for example, where viewer 134 of FIG. 2 is configured to receive and process screening signals, in step 535, a screening signal is received, and in step 540, viewer 134 of FIG. 2 takes action based on the received screening signal. It will be understood to one skilled in the art that other configurations and combinations of the steps of the methods depicted in FIG. 5A and FIG. 5B can also be employed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for screening broadcast programming, comprising:

a viewer configured to receive broadcast programming, to receive commands from a user, to receive commands from an interface coupled to the viewer, to present the received broadcast programming to the user based on commands from the user, and to present the received broadcast programming to the user based on commands from the interface;

a processor coupled to the interface and configured to receive a real time screening signal (RTSS) and a precision screening signal (PSS), to receive user input from the interface, to store the received user input, to generate a local action signal based on the user input and at least one of the received RTSS or PSS, and to transmit the local action signal to the interface;

the interface configured to receive the local action signal, to transmit commands to the viewer based on the local action signal, and to receive the user input from the user, the user input comprising at least an action preference; and a broadcast recorder coupled to the interface and configured to receive broadcast programming, to store the received broadcast programming, and to transmit the stored broadcast programming to the viewer in response to user commands, wherein the RTSS is generated based on real time monitoring of the broadcast programming being presented in real time, the PSS is generated based on a playback of at least one portion of a recording of the broadcast programming, wherein the processor, in response to the broadcast programming being presented to the user via the viewer in real time, generates the local action signal based on the RTSS, and wherein, in response to the broadcast programming being presented to the user via the viewer as a playback of the stored broadcast programming, the processor generates the local action signal based on the PSS, wherein the RTSS is generated by reconciling a plurality of screening signals from a plurality of different viewers of the broadcast programming prior to the broadcast programming being presented to the user, and wherein the PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

2. The system as recited in claim 1, wherein the broadcast recorder is further configured to modify the stored broadcast programming based on commands from the interface.

3. The system as recited in claim 1, wherein the viewer is configured to present audio broadcast programming to the user.

4. A system for screening broadcast programming, comprising:
a viewer configured to receive broadcast programming, to receive commands from a user, to receive commands from an interface coupled to the viewer, to present the received broadcast programming to the user based on commands from the user, and to present the received broadcast programming to the user based on commands from the interface; and
the interface configured to receive a real time screening signal (RTSS) and a precision screening signal (PSS), to receive user input from the user, the user input comprising at least an action preference, to store the received user input, and to transmit commands to the viewer based on the user input and at least one of the received RTSS or PSS, wherein:
the RTSS is generated based on real time monitoring of the broadcast programming being presented in real time,
the PSS is generated based on a playback of at least one portion of a recording of the broadcast programming,
in response to the broadcast programming being presented to the user via the viewer in real time, the commands are generated based on the RTSS, and
in response to the broadcast programming being presented to the user via the viewer as a playback of the stored broadcast programming, the commands are generated based on the PSS, wherein the RTSS is generated by reconciling a plurality of screening signals from a plurality of different viewers of the broadcast programming prior to the broadcast programming being presented to the user, and wherein the PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

5. A system for screening broadcast programming, comprising:
a processor coupled to an interface and configured to receive a real time screening signal (RTSS) and a precision screening signal (PSS), to receive user input from the interface, to store the received user input, to generate a local action signal based on the user input and at least one of the received RTSS or PSS, and to transmit the local action signal to the interface; and
the interface configured to receive the local action signal, to transmit the local action signal to a viewer, and to receive user input from the user, the user input comprising at least an action preference, wherein the RTSS is generated based on real time monitoring of the broadcast programming being presented in real time, the PSS is generated based on a playback of at least one portion of a recording of the broadcast programming, wherein the RTSS is used to control presentation of the broadcast programming to the user via the viewer in real time, and wherein the PSS is used to control presentation of the broadcast programming to the user via the viewer as a playback of stored broadcast programming, wherein the RTSS is generated by reconciling a plurality of screening signals from a plurality of different viewers of the broadcast programming prior to the broadcast programming being presented to the user, and wherein the PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

6. The system as recited in claim 5, wherein:
the processor is further configured to transmit the RTSS and the PSS to the interface; and
the interface is further configured to receive the RTSS and the PSS and to transmit the RTSS and the PSS to the viewer for use in generating a presentation of the broadcast programming.

7. A computer program product for screening broadcast programming, the computer program product having a recordable medium with a computer program recorded thereon, wherein the computer program, when executed by a computing device, causes the computing device to:
receive a real time screening signal (RTSS) and a precision screening signal (PSS);
receive user input from a user, the user input comprising at least an action preference;
store the received user input;
generate a local action signal based on the user input and the received screening signal;
receive the broadcast programming;
store the received broadcast programming; and
present the broadcast programming to a user, wherein the RTSS is generated based on real time monitoring of the broadcast programming being presented in real time, the PSS is generated based on a playback of at least one portion of a recording of the broadcast programming, wherein the RTSS is used to control presentation of the broadcast programming to the user in real time, and wherein the PSS is used to control presentation of the broadcast programming to the user as a playback of the stored broadcast programming, wherein the RTSS is generated by reconciling a plurality of screening signals from a plurality of different viewers of the broadcast programming prior to the broadcast programming being presented to the user, and wherein the PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

8. The computer program product as recited in claim 7, wherein the computer program further causes the computing device to modify the stored broadcast programming based on the user input and at least one of the received RTSS or PSS.

9. The computer program product as recited in claim 7, wherein the broadcast programming is audio broadcast programming.

10. A method for screening broadcast programming, comprising:
  receiving a real time screening signal (RTSS) and a precision screening signal (PSS), the RTSS and PSS associated with a broadcast programming, the broadcast programming comprising at least a content of interest (COI) segment;
  receiving the broadcast programming;
  receiving user input from a user, the user input comprising at least a COI segment type, wherein the user input further comprises at least an action preference;
  generating a local action signal based on at least one of the RTSS or the PSS and the user input;
  storing the broadcast programming; and
  presenting the broadcast programming to a user, wherein the RTSS is generated based on real time monitoring of the broadcast programming being presented in real time, the PSS is generated based on a playback of at least one portion of a recording of the broadcast programming, wherein the RTSS is used to control presentation of the broadcast programming to the user in real time, and wherein the PSS is used to control presentation of the broadcast programming to the user as a playback of the stored broadcast programming wherein the RTSS is generated by reconciling a plurality of screening signals from a plurality of different viewers of the broadcast programming prior to the broadcast programming being presented to the user, and wherein the PSS is generated based on the RTSS by having a second user view portions of the recording of the broadcast programming, prior to the broadcast programming being presented to the user via the viewer, based on content of interest segments present in the broadcast programming as specified by the RTSS and identifying a start or end of the content of interest segments present in the broadcast programming.

11. The system of claim 1, wherein the action preference identifies an action that the system is to take in response to encountering a content of interest segment in the broadcast programming.

12. The system of claim 11, wherein the action that the system is to take is to edit the content of interest segment out of the stored broadcast programming.

13. The system of claim 11, wherein the action that the system is to take is to start stop storing the broadcast programming in response to encountering the content of interest segment and to restart storing of the broadcast programming in response to the content of interest segment no longer being encountered.

14. The system of claim 11, wherein the action that the system is to take is to skip the content of interest segment during the presentation of the broadcast programming to the user.

15. The system of claim 1, wherein the user input specifies a time period to delay presentation of the received broadcast programming to the user such that the broadcast programming is stored by the broadcast recorder and the PSS is used to generate the local action signal.

16. The system of claim 4, wherein the RTSS is generated based on real time monitoring of the broadcast programming, the PSS is generated based on a playback of at least one portion of a recording of the broadcast programming, wherein the RTSS is used to control presentation of the broadcast programming to the user via the viewer in real time, and wherein the PSS is used to control presentation of the broadcast programming to the user via the viewer as a playback of stored broadcast programming.

17. The computer program product of claim 7, wherein the action preference identifies an action that the system is to take in response to encountering a content of interest segment in the broadcast programming.

18. The computer program product of claim 17, wherein the action that the system is to take is to edit the content of interest segment out of the stored broadcast programming.

19. The computer program product of claim 18, wherein the action that the system is to take is to start stop storing the broadcast programming in response to encountering the content of interest segment and to restart storing of the broadcast programming in response to the content of interest segment no longer being encountered.

20. The computer program product of claim 18, wherein the action that the system is to take is to skip the content of interest segment during the presentation of the broadcast programming to the user.

21. The computer program product of claim 7, wherein the user input specifies a time period to delay presentation of the received broadcast programming to the user such that the broadcast programming is stored by the broadcast recorder and the PSS is used to generate the local action signal.

22. The method of claim 10, wherein the user input further comprises at least one action preference associated with the COI segment type.

23. The method of claim 22, wherein the at least one action preference identifies an action that the system is to take in response to encountering a content of interest segment in the broadcast programming.

24. The method of claim 23, wherein the action that the system is to take is to edit the content of interest segment out of the stored broadcast programming.

25. The method of claim 24, wherein the action that the system is to take is to start stop storing the broadcast programming in response to encountering the content of interest segment and to restart storing of the broadcast programming in response to the content of interest segment no longer being encountered.

26. The method of claim 24, wherein the action that the system is to take is to skip the content of interest segment during the presentation of the broadcast programming to the user.

27. The method of claim 10, wherein the user input specifies a time period to delay presentation of the received broadcast programming to the user such that the broadcast programming is stored by the broadcast recorder and the PSS is used to generate the local action signal.

* * * * *